United States Patent
Versailles et al.

(10) Patent No.: US 8,975,838 B2
(45) Date of Patent: Mar. 10, 2015

(54) ELECTRIC MOTOR BRAKING USING THERMOELECTRIC COOLING

(71) Applicants: Richard E. Versailles, New Hartford, CA (US); Robert D. Klapatch, Wethersfield, CA (US); Kerry R. Querns, Durham, CT (US)

(72) Inventors: Richard E. Versailles, New Hartford, CA (US); Robert D. Klapatch, Wethersfield, CA (US); Kerry R. Querns, Durham, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 214 days.

(21) Appl. No.: 13/645,850

(22) Filed: Oct. 5, 2012

(65) Prior Publication Data

US 2014/0097772 A1  Apr. 10, 2014

(51) Int. Cl.
*H02P 3/12* (2006.01)
*H02P 3/22* (2006.01)

(52) U.S. Cl.
USPC ........... 318/380; 318/369; 318/370; 318/372; 361/690; 361/700

(58) Field of Classification Search
USPC ........... 318/380, 369, 370, 372; 361/690, 700
See application file for complete search history.

(56) References Cited

U.S. PATENT DOCUMENTS

| | | |
|---|---|---|
| 5,371,665 A | 12/1994 | Quisenberry et al. |
| 6,430,045 B1 * | 8/2002 | Everitt ........................... 361/690 |
| 6,680,596 B1 | 1/2004 | DeCicco |
| 6,897,576 B2 | 5/2005 | Ishikawa et al. |
| 7,109,686 B2 * | 9/2006 | Schulte et al. ................. 320/167 |
| 7,459,888 B2 * | 12/2008 | Schulte et al. ................. 320/166 |
| 7,633,271 B2 * | 12/2009 | Schulte et al. ................. 320/167 |
| 7,721,855 B2 * | 5/2010 | Marsh et al. ........... 188/264 AA |
| 7,902,957 B2 * | 3/2011 | Lukaszewski et al. ......... 338/53 |
| 8,009,393 B2 | 8/2011 | Katsumata |
| 8,035,349 B2 * | 10/2011 | Lubawy ........................ 320/150 |
| 8,136,643 B2 * | 3/2012 | Marsh et al. .............. 188/264 A |
| 8,220,590 B2 * | 7/2012 | Chen et al. .................... 187/290 |
| 8,534,432 B2 * | 9/2013 | Kumar et al. ............. 188/264 A |
| 2002/0024221 A1 * | 2/2002 | Grewe et al. ................. 290/40 C |
| 2004/0149160 A1 * | 8/2004 | Foesel et al. .................... 105/35 |
| 2006/0103358 A1 * | 5/2006 | Schulte et al. ................. 320/166 |
| 2006/0176028 A1 * | 8/2006 | Schulte et al. ................. 320/166 |
| 2007/0144800 A1 * | 6/2007 | Stone .......................... 180/65.3 |
| 2007/0272116 A1 * | 11/2007 | Bartley et al. .................... 105/35 |
| 2008/0000381 A1 * | 1/2008 | Bartley et al. .................... 105/49 |
| 2008/0164155 A1 * | 7/2008 | Pease et al. ................. 205/777.5 |
| 2008/0174174 A1 * | 7/2008 | Burns et al. .................... 303/152 |
| 2008/0266046 A1 * | 10/2008 | Lukaszewski et al. ......... 338/53 |
| 2008/0266801 A1 * | 10/2008 | Weiss et al. .................... 361/700 |
| 2008/0266802 A1 * | 10/2008 | Weiss et al. .................... 361/700 |
| 2008/0266803 A1 * | 10/2008 | Golhardt et al. ............... 361/700 |
| 2010/0014219 A1 * | 1/2010 | Strack et al. .................. 361/677 |
| 2010/0065380 A1 * | 3/2010 | Chen et al. .................... 187/290 |
| 2010/0079115 A1 * | 4/2010 | Lubawy ........................ 320/150 |
| 2010/0090625 A1 * | 4/2010 | Nagashima et al. .......... 318/376 |
| 2011/0146740 A1 | 6/2011 | St. Rock et al. |
| 2013/0082045 A1 * | 4/2013 | Mazumdar .................... 219/494 |

* cited by examiner

*Primary Examiner* — Paul Ip
(74) *Attorney, Agent, or Firm* — Cantor Colburn LLP

(57) ABSTRACT

An electric motor controller includes controller electronics configured to control an electric motor. The electric motor controller also includes a thermoelectric cooler in thermal communication with the controller electronics. The thermoelectric cooler is configured to receive a braking current associated with braking of the electric motor and provide cooling to the controller electronics.

18 Claims, 4 Drawing Sheets

ELECTRIC MOTOR BRAKING USING THERMOELECTRIC COOLING

STATEMENT OF GOVERNMENT RIGHTS

This invention was made with Government support under Contract No. FA8650-06-D-2621 awarded by the United States Air Force. The Government may therefore have certain rights in this invention.

BACKGROUND OF THE INVENTION

The subject matter disclosed herein relates to electric motor braking and, more particularly, to electric motor braking using thermoelectric cooling.

Many systems are designed to use a motor controller to control speed and torque of an electric motor. A shaft of the electric motor drives an inertial mass and an aiding or apposing torque of a load. When accelerating, the electric motor converts electrical energy into mechanical torque to accelerate the inertial mass of the load. When decelerating, kinetic energy of the load is typically converted back into electrical energy by the electric motor. If possible, all or some of the regenerated energy can be transferred back into a power system of the electric motor. If this transfer is not desired or the deceleration needs to be faster, a braking resistor is used. When a braking resistor is used, the regenerated energy is dissipated as heat. The heat created is wasted energy, which in turn, causes the motor controller to run hotter. To accommodate heating effects of the braking resistor, the size of passive cooling elements used to remove heat from the motor controller may have to be increased.

In applications where the internal temperature of the motor controller is near the design limits of electronic components of the motor controller, life expectancy of the electronic components can be substantially reduced. Reducing heat in the motor controller can increase the reliability of the motor controller.

BRIEF DESCRIPTION OF THE INVENTION

According to one aspect of the invention, an electric motor controller includes controller electronics configured to control an electric motor. The electric motor controller also includes a thermoelectric cooler in the thermal path for the controller electronics. The thermoelectric cooler is configured to receive a braking current associated with braking of the electric motor and provide cooling to the controller electronics.

According to another aspect of the invention, an electric motor control system includes an electric motor and an electric motor controller electrically coupled to the electric motor. The electric motor controller includes controller electronics configured to control the electric motor and also includes a thermoelectric cooler used to thermally cool the controller electronics. The electric motor controller further includes a braking circuit configured to receive an input braking current from the controller electronics associated with braking of the electric motor and provide a braking current to the thermoelectric cooler.

According to a further aspect of the invention, a method of thermoelectric cooling in an electric motor controller is provided. The method includes receiving a braking current responsive to braking of an electric motor. The electric motor is controlled by controller electronics. The braking current is applied to a thermoelectric cooler in thermal communication with the controller electronics, thereby cooling the controller electronics.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
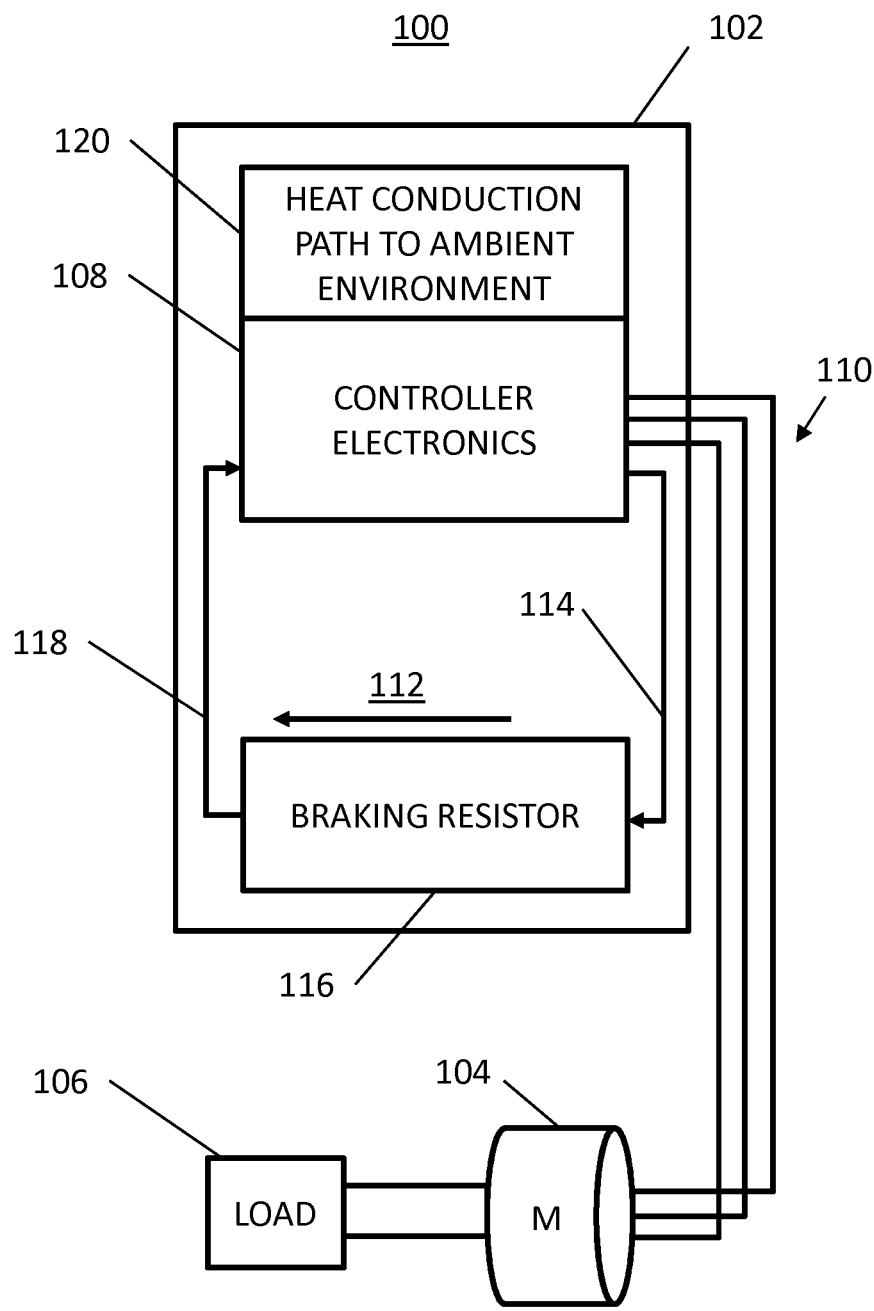
FIG. 1 is a schematic view of an electric motor control system in accordance with the prior art.

An example of a typical electric motor control system 100 is depicted in FIG. 1. A motor controller 102 controls operation of an electric motor 104 which drives a load 106. The motor controller 102 includes controller electronics 108 coupled to the electric motor 104 by control lines 110 to control speed, torque, acceleration, and deceleration of the electric motor 104. When decelerating the electric motor 104, kinetic energy of the load 106 is typically converted back into electrical energy by the electric motor 104 and passed as a braking current 112 on braking input 114 from the controller electronics 108 through a braking resistor 116 and back through braking return 118. Heat produced by dissipating the braking current 112 in the braking resistor 116 adds to total heat within the motor controller 102. A heat conduction path to ambient environment 120 provides a heat dissipation path for heat within the motor controller 102 to reach a cooler environment external to the motor controller 102.

Figure 2:
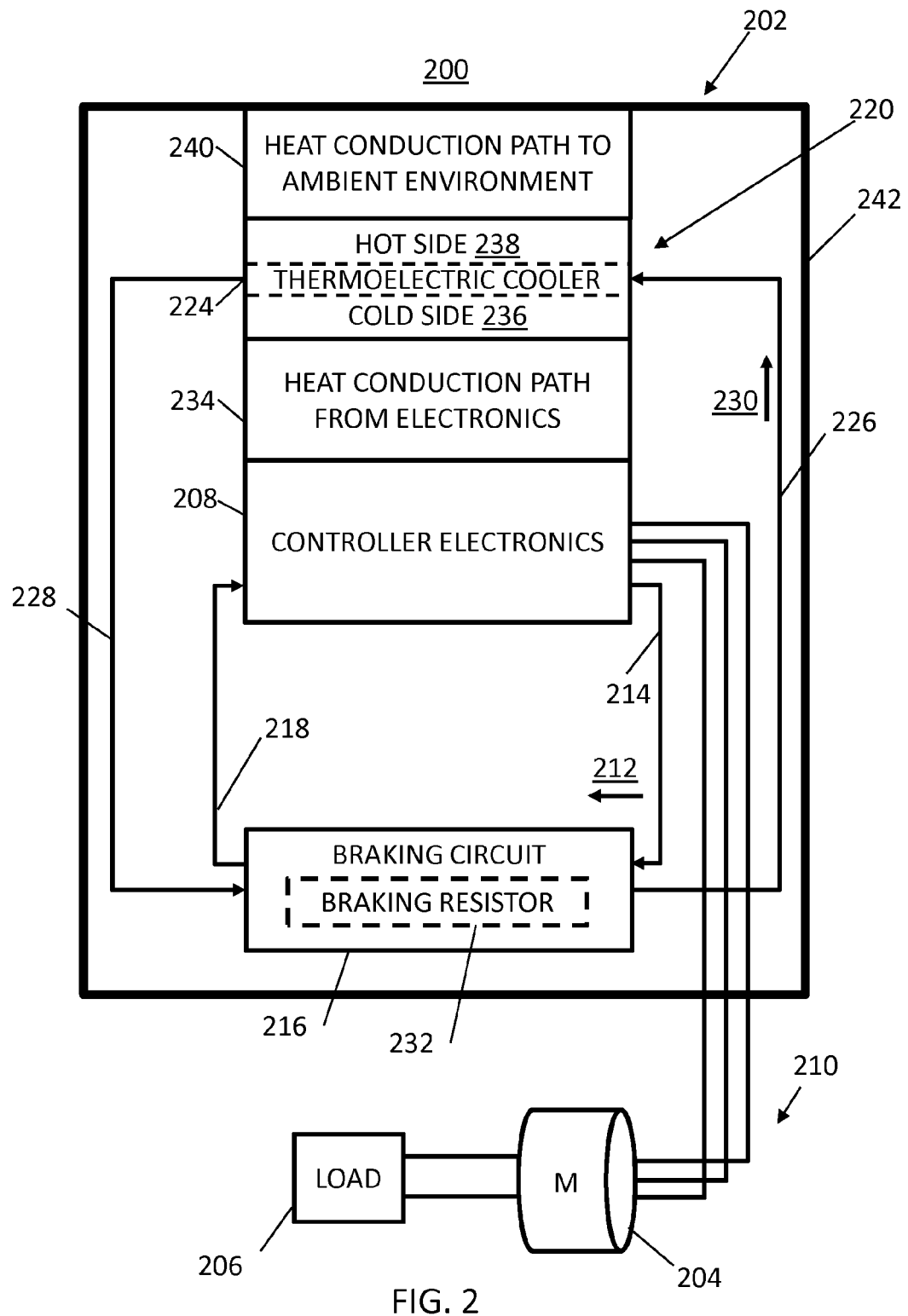
FIG. 2 is a schematic view of an electric motor control system using thermoelectric cooling in accordance with an exemplary embodiment.

In exemplary embodiments, by replacing all or part of the resistance of the braking resistor 116 of FIG. 1 with thermoelectric cooling components, braking heat generation may be decreased and heat dissipation accelerated. FIG. 2 is a schematic view of an electric motor control system 200 using thermoelectric cooling in accordance with an exemplary embodiment. Similar to the electric motor control system 100 of FIG. 1, the electric motor control system 200 of FIG. 2 includes an electric motor controller 202 that controls operation of an electric motor 204 which drives a load 206. The electric motor controller 202 includes controller electronics 208 coupled to the electric motor 204 by control lines 210 to control speed, torque, acceleration, and deceleration of the electric motor 204. In the example of FIG. 2, when decelerating the electric motor 204, kinetic energy of the load 206 is converted back into electrical energy by the electric motor 204 and passed as an input braking current 212 on braking input 214 from the controller electronics 208 through a braking circuit 216 and back through braking return 218. Although depicted separately, it will be understood that the braking circuit 216 can be incorporated in the controller electronics 208.

An equivalent resistance of the braking resistor 116 of FIG. 1 is replaced in whole or in part with resistance of a cooling circuit 220 in FIG. 2. The cooling circuit 220 includes a thermoelectric cooler 224 coupled to a cooler electrical input 226 and a cooler electrical return 228. In the example of FIG. 2, the braking circuit 216 is coupled to the cooler electrical input 226 and the cooler electrical return 228. Accordingly, the thermoelectric cooler 224 is configured to receive a braking current 230 associated with braking of the electric motor 204, where the braking circuit 216 receives the input braking current 212 from the controller electronics 208 and provides the braking current 230 to the thermoelectric cooler 224. In embodiments where the cooling circuit 220 has a resistance that is substantially equivalent to the braking resistor 116 of FIG. 1, the braking circuit 216 is absent a braking resistor such that the braking current 230 is equivalent to the input braking current 212. In embodiments where the cooling circuit 220 has a resistance that is less than the braking resistor 116 of FIG. 1, the braking circuit 216 includes a braking resistor 232. The braking resistor 232 may produce less heat than the braking resistor 116 of FIG. 1. When the braking circuit 216 includes the braking resistor 232, the braking circuit 216 may be configured to divide the input braking current 212 between the braking resistor 232 and the thermoelectric cooler 224. Alternatively, the braking resistor 232 can be configured in series with the thermoelectric cooler 224, such that the braking current 230 is equivalent to the input braking current 212.

In the embodiment depicted in FIG. 2, the controller electronics 208, the braking circuit 216, and the thermoelectric cooler 224 are located within a motor controller housing 242 of the electric motor controller 202. The electric motor controller 202 also includes a heat conduction path 234 that places the thermoelectric cooler 224 in thermal communication with the controller electronics 208. The heat conduction path 234 can be, for example, a cold plate. Heat flows from the controller electronics 208 through the heat conduction path 234 to a cold side 236 of the thermoelectric cooler 224. Heat may also flow from the braking circuit 216 through the heat conduction path 234 to the cold side 236 of the thermoelectric cooler 224. When all or a portion of the input braking current 212 is applied to the thermoelectric cooler 224 as braking current 230, the thermoelectric cooler 224 creates a thermal effect that causes heat to flow from the cold side 236 to a hot side 238 of the thermoelectric cooler 224. The hot side 238 of the thermoelectric cooler 224 has a heat conduction path 240 to an ambient environment external to the electric motor controller 202. The thermoelectric cooler 224 is an active electrically powered cooling device that can operate according to the Peltier effect in which an electrical input is transformed to a heat flux. Thermal electric materials of the thermoelectric cooler 224 may be bulk, quantum well or other electronic cooling materials. For example, the thermoelectric cooler 224 can include solid-state devices that use the Peltier effect to create a heat flux between junctions of two different types of materials, such that heat is transferred from the cold side 236 to the hot side 238 against a thermal gradient with the consumption of electrical energy.

Figure 3:
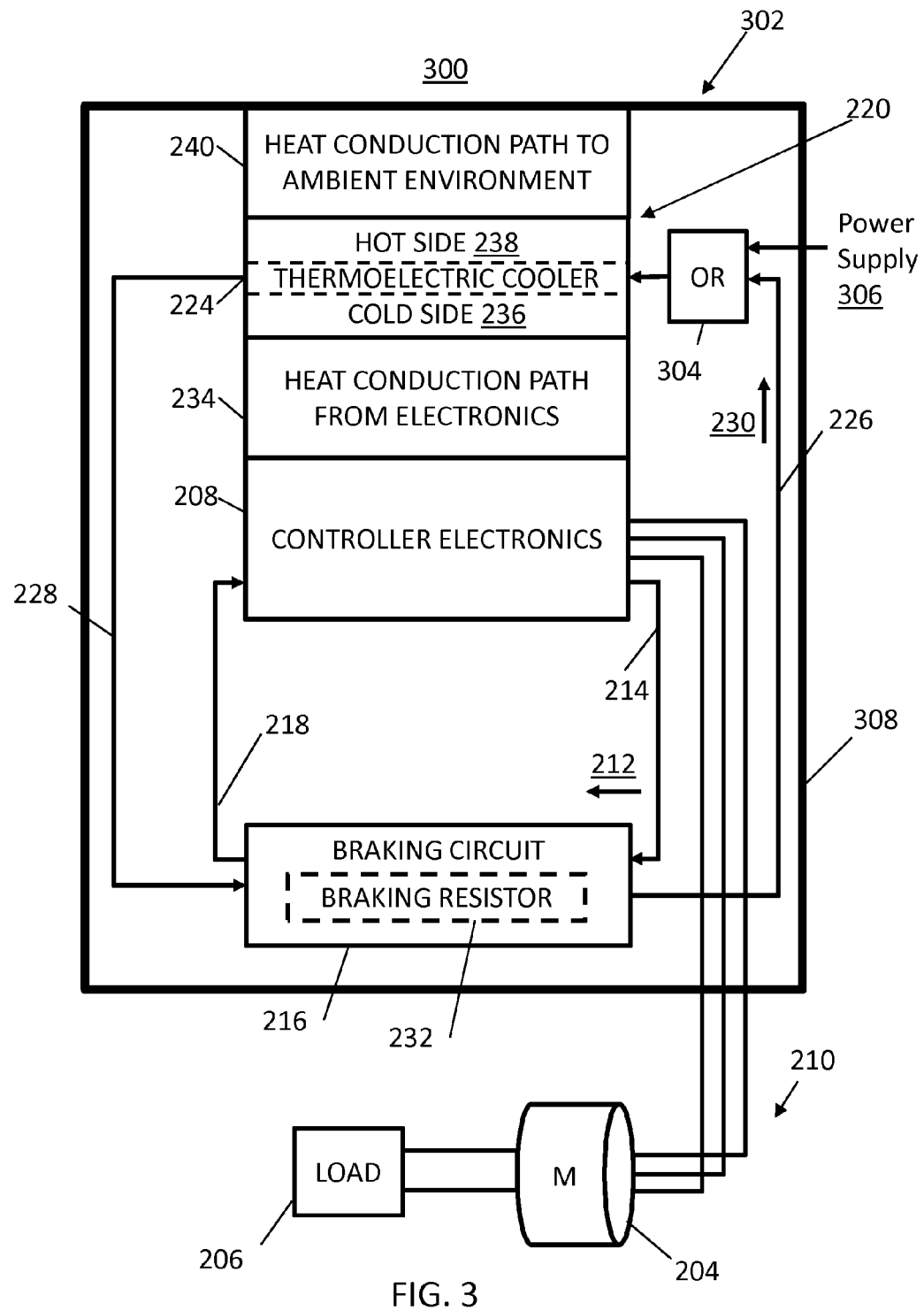
FIG. 3 is a schematic view of an electric motor control system using thermoelectric cooling in accordance with another exemplary embodiment.

FIG. 3 is a schematic view of an electric motor control system 300 using thermoelectric cooling in accordance with another exemplary embodiment. The electric motor control system 300 of FIG. 3 is similar to the electric motor control system 200 of FIG. 2, where like elements have like numbers. Similar to the electric motor control system 200 of FIG. 2, the electric motor control system 300 of FIG. 3 includes an electric motor controller 302 that controls operation of the electric motor 204 which drives the load 206. The electric motor controller 302 includes controller electronics 208 coupled to the electric motor 204 by control lines 210 to control speed, torque, acceleration, and deceleration of the electric motor 204. Also similar to FIG. 2, the electric motor control system 300 of FIG. 3 includes the braking circuit 216 electrically coupled to the controller electronics 208 by the braking input 214 and the braking return 218, as well as to the thermoelectric cooler 224 by the cooler electrical input 226 and the cooler electrical return 228.

In the example of FIG. 3, the thermoelectric cooler 224 provides cooling for the controller electronics 208 through heat conduction paths 234 and 240 and cold and hot sides 236 and 238. In contrast to FIG. 2, which relies upon the braking current 230 from input braking current 212 to electrically power the thermoelectric cooler 224, the electric motor controller 302 includes a power logical-OR function 304 to provide power from the braking current 230 on the cooler electrical input 226 and/or from an external power supply 306. The external power supply 306 may be delivered from a source external to a motor controller housing 308 of the electric motor controller 302, such as an alternator/generator or a power bus accessible by the electric motor control system 300. The power logical-OR function 304 may be configured to draw current from the external power supply 306 when no/insufficient current is available from the braking current 230. The power logical-OR function 304 can be incorporated into the braking circuit 216, with the thermoelectric cooler 224, or can be a separate circuit.

Figure 4:
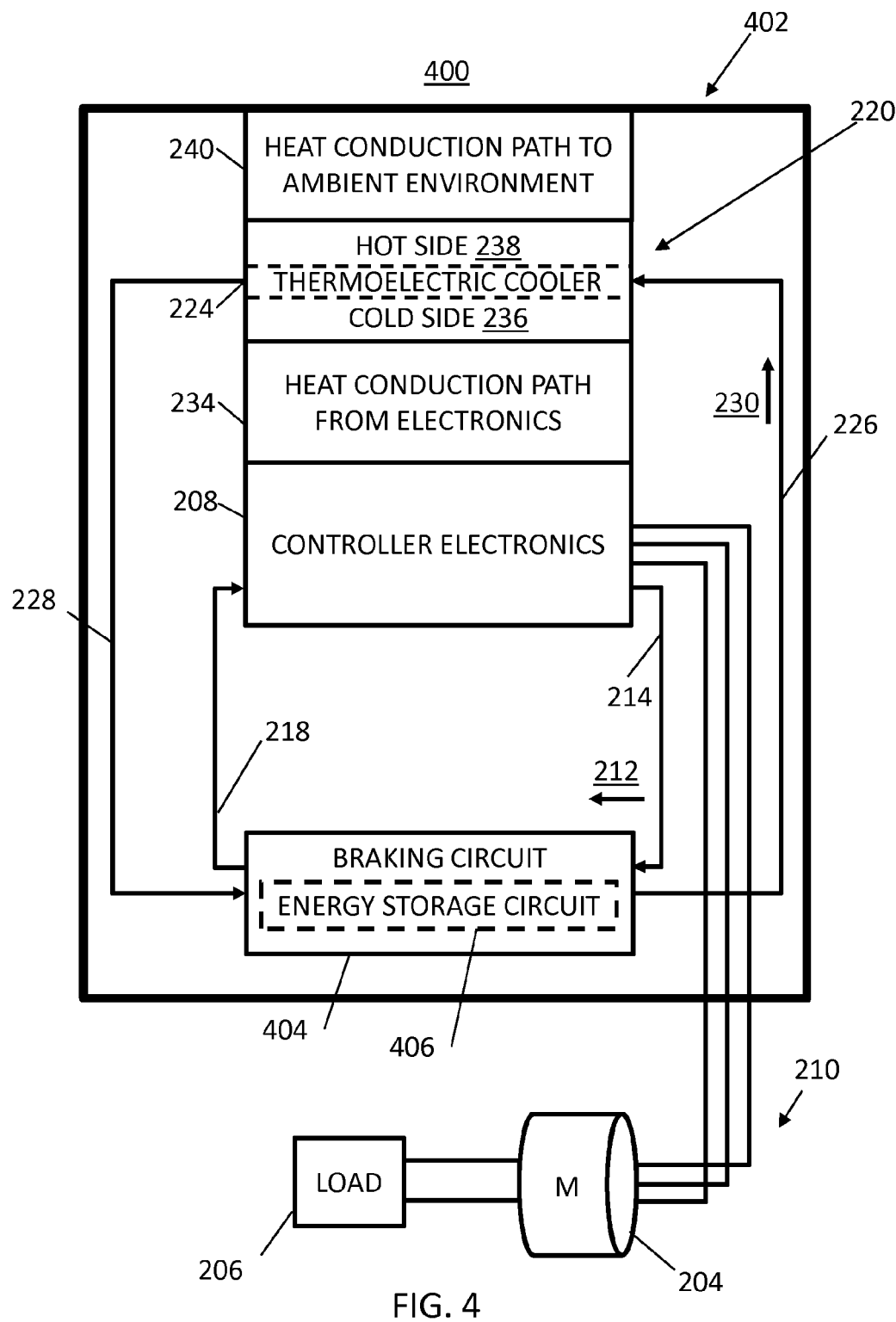
FIG. 4 is a schematic view of an electric motor control system using thermoelectric cooling in accordance with a further exemplary embodiment.

FIG. 4 is a schematic view of an electric motor control system 400 using thermoelectric cooling in accordance with a further exemplary embodiment. The electric motor control system 400 of FIG. 4 is similar to the electric motor control system 200 of FIG. 2, where like elements have like numbers. Similar to the electric motor control system 200 of FIG. 2, the electric motor control system 400 of FIG. 4 includes an electric motor controller 402 that controls operation of the electric motor 204 which drives the load 206. The electric motor controller 402 includes controller electronics 208 coupled to the electric motor 204 by control lines 210 to control speed, torque, acceleration, and deceleration of the electric motor 204. Also similar to FIG. 2, the electric motor control system 400 of FIG. 4 includes a braking circuit 404 electrically coupled to the controller electronics 208 by the braking input 214 and the braking return 218, as well as to the thermoelectric cooler 224 by the cooler electrical input 226 and the cooler electrical return 228. Although depicted separately, it will be understood that the braking circuit 404 can be incorporated in the controller electronics 208.

In the example of FIG. 4, the thermoelectric cooler 224 provides cooling for the controller electronics 208 through heat conduction paths 234 and 240 and cold and hot sides 236 and 238. In contrast to FIG. 2, the braking circuit 404 includes an energy storage circuit 406 configured to store energy of the input braking current 212 and provide the braking current 230 to the thermoelectric cooler 224 over a period of time. Energy storage in the energy storage circuit 406 may be achieved using an ultra-capacitor or other storage element (not depicted). Also, similar to the braking circuit 216 of FIGS. 2 and 3, the braking circuit 404 can include the braking resistor 232 of FIGS. 2 and 3. Additionally, although depicted as part of the braking circuit 404, the energy storage circuit 406 can be located external to the braking circuit 404. As a further alternative, the electric motor controller 402 can also include a power logical-OR function, such as the power logical-OR function 304 of FIG. 3, such that the thermoelectric cooler 224 can receive electric power from one or more of an external power supply and the braking circuit 404.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An electric motor controller comprising:
   controller electronics configured to control an electric motor;
   a braking circuit configured to receive an input braking current from the controller electronics, the input braking current generated during braking of the electric motor; and
   a thermoelectric cooler in thermal communication with the controller electronics and configured to receive a braking current from the braking circuit based on the input braking current, and the thermoelectric cooler operable to provide cooling to the controller electronics in response to receiving the braking current.

2. The electric motor controller of claim 1, wherein a cold side of the thermoelectric cooler is thermally coupled to a heat conduction path from the controller electronics, and a hot side of the thermoelectric cooler is thermally coupled to a heat conduction path to an ambient environment.

3. The electric motor controller of claim 1, wherein the braking circuit comprises a braking resistor and the braking circuit is further configured to divide the input braking current between the braking resistor and the thermoelectric cooler.

4. The electric motor controller of claim 1, further comprising:
   an external power supply electrically coupled to the thermoelectric cooler, wherein the thermoelectric cooler is configured to receive electric power from one or more of the external power supply and the braking circuit.

5. The electric motor controller of claim 1, wherein the braking circuit, the thermoelectric cooler, and the controller electronics are within a motor controller housing.

6. The electric motor controller of claim 1, further comprising:
   an energy storage circuit configured to store energy of the input braking current and provide the braking current to the thermoelectric cooler over a period of time.

7. An electric motor control system comprising:
   an electric motor; and
   an electric motor controller electrically coupled to the electric motor, the electric motor controller comprising:
   controller electronics configured to control the electric motor;
   a thermoelectric cooler in thermal communication with the controller electronics; and
   a braking circuit configured to receive an input braking current from the controller electronics, the input braking current generated during braking of the electric motor, and the braking circuit provides a braking current to the thermoelectric cooler based on the input braking current.

8. The electric motor control system of claim 7, wherein a cold side of the thermoelectric cooler is thermally coupled to a heat conduction path from the controller electronics, and a hot side of the thermoelectric cooler is thermally coupled to a heat conduction path to an ambient environment.

9. The electric motor control system of claim 7, wherein the braking circuit comprises a braking resistor and the braking circuit is further configured to divide the input braking current between the braking resistor and the thermoelectric cooler.

10. The electric motor control system of claim 7, further comprising:
    an external power supply electrically coupled to the thermoelectric cooler, wherein the thermoelectric cooler is configured to receive electric power from one or more of the external power supply and the braking circuit.

11. The electric motor control system of claim 7, wherein the braking circuit, the thermoelectric cooler, and the controller electronics are within a motor controller housing of the electric motor controller.

12. The electric motor control system of claim 7, further comprising:
    an energy storage circuit configured to store energy of the input braking current and provide the braking current to the thermoelectric cooler over a period of time.

13. A method of thermoelectric cooling in an electric motor controller, the method comprising:
    receiving an input braking current at a braking circuit from controller electronics responsive to braking of an electric motor, the electric motor controlled by the controller electronics;
    providing a braking current from the braking circuit to a thermoelectric cooler based on the input braking current; and
    applying the braking current to the thermoelectric cooler in thermal communication with the controller electronics, thereby cooling the controller electronics.

14. The method of claim 13, further comprising:
    thermally coupling a cold side of the thermoelectric cooler to a heat conduction path from the controller electronics; and
    thermally coupling a hot side of the thermoelectric cooler to a heat conduction path to an ambient environment.

15. The method of claim 13, wherein the braking circuit comprises a braking resistor, and the method further comprising:
    dividing the input braking current between the braking resistor and the thermoelectric cooler.

16. The method of claim 13, further comprising:
    providing the thermoelectric cooler with electric power from one or more of an external power supply and the braking circuit.

17. The method of claim 13, wherein the braking circuit, the thermoelectric cooler, and the controller electronics are within a motor controller housing.

18. The method of claim 13, further comprising:
    storing energy of the input braking current; and
    providing the braking current to the thermoelectric cooler over a period of time.

* * * * *